(12) United States Patent
Jones

(10) Patent No.: US 6,513,395 B1
(45) Date of Patent: Feb. 4, 2003

(54) CIRCULARLY MAGNETIZED DISK-SHAPED TORQUE TRANSDUCER AND METHOD FOR MEASURING TORQUE USING SAME

(75) Inventor: Christopher A Jones, Hamilton, IL (US)

(73) Assignee: Magna-Lastic Devices, Inc., Carthage, IL (US)

( * ) Notice: Subject to any disclaimer, the term of this patent is extended or adjusted under 35 U.S.C. 154(b) by 0 days.

(21) Appl. No.: 09/548,185

(22) Filed: Apr. 13, 2000

Related U.S. Application Data

(60) Provisional application No. 60/129,613, filed on Apr. 16, 1999.

(51) Int. Cl.[7] .................................................. G02L 3/02
(52) U.S. Cl. .................................................. 73/862.333
(58) Field of Search ........................ 73/862.333, 862.69, 73/862.336, 862.335; 29/602.1; 324/220

(56) References Cited

U.S. PATENT DOCUMENTS

| | | | |
|---|---|---|---|
| 4,479,390 A | * 10/1984 | Meixner ................. | 73/862.333 |
| 4,697,460 A | * 10/1987 | Sugiyama et al. ........ | 324/209 |
| 4,873,874 A | * 10/1989 | Sobel ..................... | 73/862.333 |
| 4,896,544 A | 1/1990 | Garshelis | |
| 5,351,555 A | 10/1994 | Garshelis | |
| 5,520,059 A | 5/1996 | Garshelis | |
| 5,708,216 A | * 1/1998 | Garshelis ................ | 73/862.335 |
| 5,907,105 A | 5/1999 | Pinkerton et al. | |
| 6,047,605 A | 4/2000 | Garshelis | |
| 6,145,387 A | * 11/2000 | Garshelis ................ | 324/207.21 |

* cited by examiner

Primary Examiner—Max Noori
(74) Attorney, Agent, or Firm—Blank Rome Comisky & McCauley LLP

(57) ABSTRACT

A magnetoelastic torque sensor for providing an output signal indicative of the torque transmitted between radially separated locations of a disk-shaped member includes a magnetoelastically active, ferromagnetic, magnetostrictive region which is magnetically polarized in a single circumferential direction and possesses sufficient magnetic anisotropy to return the magnetization in the region, following the application of torque to the member, to the single circumferential direction when the applied force is reduced to zero. First and second torque transmitting elements are directly attached to or form a part of the member at its central axis of rotation and its periphery in such a manner that torque is proportionally transmitted between the member and the transmitting elements. Magnetic field sensor means are mounted proximate to the member to sense the magnitude of the magnetic field produced by the member in response to the torque which is radially transmitted through the member between the first and second transmitting elements. The member is preferably formed of a polycrystalline material wherein at least 50% of the distribution of local magnetizations lie within a 90° quadrant symmetrically disposed around the single circular direction and has a coercivity sufficiently high that the field arising from the member does not magnetize proximate regions of the member to give rise to parasitic magnetic fields which are of sufficient strength to destroy the usefulness, for force sensing purposes, of the net magnetic field seen by the magnetic field sensor means.

31 Claims, 1 Drawing Sheet

CIRCULARLY MAGNETIZED DISK-SHAPED TORQUE TRANSDUCER AND METHOD FOR MEASURING TORQUE USING SAME

CROSS-REFERENCE TO RELATED APPLICATIONS

This application claims the priority of U.S. provisional application Serial No. 60/129,613, filed Apr. 16, 1999.

FIELD OF THE INVENTION

The present invention relates to torque sensors and, more particularly, to non-contacting magnetoelastic torque sensors for providing a measure of the torque transmitted radially in a disk-shaped member.

BACKGROUND OF THE INVENTION

In the control of systems having rotating drive shafts, torque and speed are the fundamental parameters of interest. Therefore, the sensing and measurement of torque in an accurate, reliable and inexpensive manner has been a primary objective of workers for several decades.

Previously, torque measurement was accomplished using contact-type sensors directly attached to the shaft. One such sensor is a "strain gauge" type torque detection apparatus, in which one or more strain gauges are directly attached to the outer peripheral surface of the shaft and a change in resistance caused by strain is measured by a bridge circuit or other well known means. However, contact-type sensors are relatively unstable and of limited reliability due to the direct contact with the rotating shaft. In addition, they are very expensive and are thus commercially impractical for competitive use in many of the applications, such as automotive steering systems, for which torque sensors are now being sought.

Subsequently, non-contact torque sensors of the magnetostrictive type were developed for use with rotating shafts. For example, U.S. Pat. No. 4,896,544 to Garshelis discloses a sensor comprising a torque carrying member, with an appropriately ferromagnetic and magnetostrictive surface, two axially distinct circumferential bands within the member that are endowed with respectively symmetrical, helically directed residual stress induced magnetic anisotropy, and a magnetic discriminator device for detecting, without contacting the torqued member, differences in the response of the two bands to equal, axial magnetizing forces. Most typically, magnetization and sensing are accomplished by providing a pair of excitation or magnetizing coils overlying and surrounding the bands, with the coils connected in series and driven by alternating current. Torque is sensed using a pair of oppositely connected sensing coils for measuring a difference signal resulting from the fluxes of the two bands. Unfortunately, providing sufficient space for the requisite excitation and sensing coils on and around the device on which the sensor is used has created practical problems in applications where space is at a premium. Also, such sensors appear to be impractically expensive for use on highly cost-competitive devices, such as in automotive applications.

Most recently, torque transducers based on measuring the field arising from the torque induced tilting of initially circumferential remanent magnetizations have been developed which, preferably, utilize a thin wall ring ("collar") serving as the field generating element. See, for example, U.S. Pat. Nos. 5,351,555 and 5,520,059 to Garshelis. Tensile "hoop" stress in the ring, associated with the means of its attachment to the shaft carrying the torque being measured establishes a dominant, circumferentially directed, uniaxial anisotropy. Upon the application of torsional stress to the shaft, the magnetization reorients and becomes increasingly helical as torsional stress increases. The helical magnetization resulting from torsion has both a circumferential component and an axial component, the magnitude of the axial component depending entirely on the torsion. One or more magnetic field vector sensors sense the magnitude and polarity of the field arising, as a result of the applied torque, in the space about the transducer and provides a signal output reflecting the magnitude of the torque. Inasmuch as the peak allowable torque in a ring sensor is limited by slippage at the ring/shaft interface, concerns have been expressed regarding distortion arising from slippage at the ring/shaft interface under conditions of torque overload. This, together with the need for multiple parts of different materials to minimize the adverse effects of parasitic fields, have encouraged the investigation of alternative constructions.

Most recently, magnetoelastic torque transducers have been developed in which the active, torque sensing region is formed directly on the shaft itself, rather than on a separate ferromagnetic element which then has to be affixed to the shaft. See, for example, PCT International Publication Nos. WO 99/21150 and WO 99/21151. In one form of these newly developed transducers, the magnetoelastically active region is polarized in a single circumferential direction and possesses sufficient magnetic anisotropy to return the magnetization in the region, following the application of torque to the member, to the single circumferential direction when the applied torque is reduced to zero. The torqued shaft is desirably formed of a polycrystalline material wherein at least 50% of the distribution of local magnetizations lie within a 90° quadrant symmetrically disposed around the direction of magnetic polarization and have a coercivity sufficiently high that the transducing region field does not create parasitic magnetic fields in proximate regions of the shaft of sufficient strength to destroy the usefulness, for torque sensing purposes, of the net magnetic field seen by the magnetic field sensor. In particularly preferred forms of such transducers the shaft is formed of a randomly oriented, polycrystalline material having cubic symmetry and the coercivity is greater than 15, desirably greater than 20 and, preferably, greater than 35.

In all of the non-contact magnetoelastic torque transducers developed to date, the transducer element has been disposed axially along a shaft used to transmit torque between axially separated locations on the shaft. However, in many applications, axial space is severely limited and/or torque is inherently being transmitted between radially separated locations, e.g., from a shaft to a rim or vice versa, as in a gear, pulley, chain sprocket, and the like. The need to accurately and non-contactingly sense torque in such devices has not heretofore been addressed.

DETAILED DESCRIPTION OF THE PREFERRED EMBODIMENTS

Figure 1:
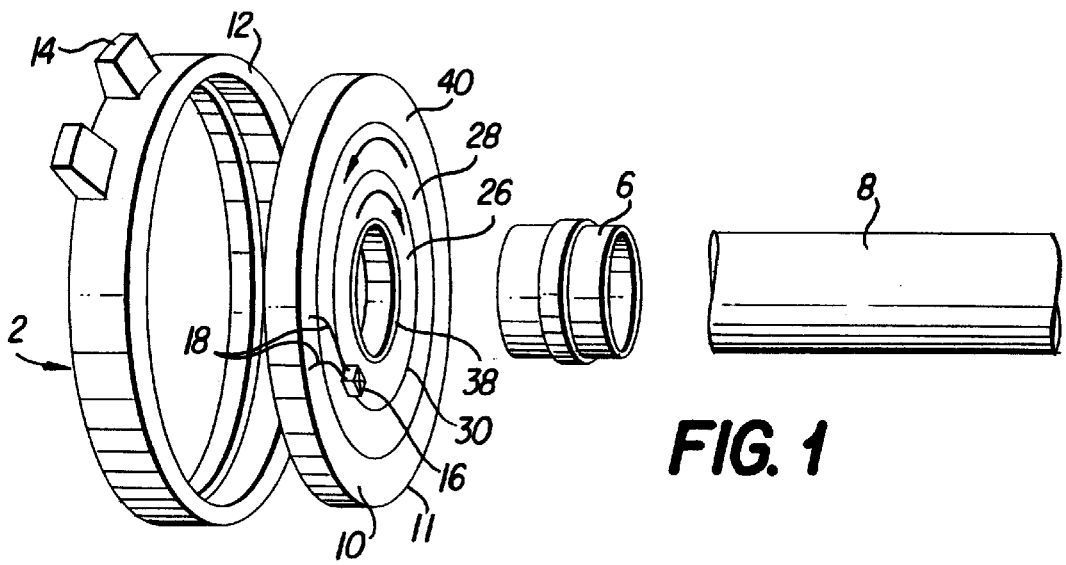
FIG. 1 is an exploded perspective view showing the torque sensor of the present invention.

Referring first to FIG. 1, a torque transducer according to the present invention is shown generally at 2. Torque transducer 2 comprises an axially thin, generally disk-shaped sensor having three fundamental, but not necessarily distinct, elements. The transducer includes a center hub 6 for rigidly attaching the disk-shaped sensor to a shaft 8. Attachment may be accomplished directly or indirectly by any known means which permits the hub 6 and shaft 8 to act as a mechanical unit such that torque applied to the shaft 8 is proportionally transmitted to the hub 6, and vice versa. Examples of means of attachment include pins, splines, keys, welds, adhesives, press or shrink fits, and the like. The disk 10 of the transducer is, or at least includes, the magnetoelastically active region and is attached to the hub 6 by any appropriate method which permits the disk 10 and hub 6 to act as a mechanical unit such that torque applied to the hub 6 is proportionally transmitted to the disk 10, and vice versa. Examples of means of attachment include riveting, welding, and the like. Surrounding the periphery of disk 10 is rim 12 which is attached to the peripheral edge of disk 10 by appropriate means in a manner that the disk 10 and rim 12 act as a mechanical unit such that torque applied to the disk 10 is proportionally transmitted to the rim 12, and vice versa. The rim 12 includes, generally, along its outer periphery, force transfer features 14 for the transfer of predominantly tangential forces to a driving or driven member. For example, such features might include gear teeth for engaging mating teeth in another gear, grooves for a V-belt, ripples or other molded features to enable the rim to be grasped by human hands (e.g., as the rim of a steering wheel), means for attachment of a tire, pin connections to a link, and the like.

The rim 12 and hub 6 are preferably formed of non-ferrogmagnetic materials or are magnetically isolated from the disk 10 by non-ferromagnetic spacers, such as low permeability rings inserted between the hub 6 and disk 10 and between the disk 10 and rim 12. Disk 10 is or includes the magnetically active element of the transducer and, therefore, material selection for forming the disk 10 is very important. The material selected must be ferromagnetic to assure the existence of magnetic domains and must be magnetostrictive in order that the orientation of the magnetization may be altered by the stresses associated with the applied torque. Exemplary materials are disclosed in columns 12 and 13 of U.S. Pat. No. 5,520,059, the disclosure of which is incorporated herein by reference. In particular, disk 10 may be formed of a material having a particularly desirable crystalline structure, as will be described more fully hereinafter.

Disk 10 is preferably thin, so as to maximize the stress for a given torque and to develop a useful signal. In this connection, the design geometry of the disk 10 can be controlled in such a way as to create as uniform as possible a stress distribution throughout its radial extent. It is desirable, where possible, to control the design geometry to create a substantially uniform stress distribution throughout the radial extent of the disk. Varying the thickness of the disk 10 is the most likely method of controlling stress distribution. However, inasmuch as stress varies in accordance with the following relationship:

$$\text{Torque}/2\pi \text{radius}^2 \times \text{thickness}$$

it can be seen that controlling the thickness will have only a limited impact on the stress. Inasmuch as the thickness varies with the radius squared, the uniformity of the stress can be enhanced by decreasing the thickness as the radius increases. For example, tapering the disk 10 from a maximum thickness at the hub 6 to a minimum thickness at the rim 12 will help make the shear stress more uniform over its entire radial extent. The stress to which the disk 10 is subjected is, in the first instance, commensurate with and limited by the materials used. However, the disk 10 is, desirably, relatively highly stressed in order to develop a useful signal. Stresses are minimally a few thousand psi but, preferably, are tens of thousands psi.

Disk 10 comprises one or more radially distinct, magnetically contiguous, oppositely polarized circumferential bands or regions solely defining the active or transducer region of the sensor. This is achieved by magnetizing the disk 10 in a substantially purely circumferential direction throughout some radial extent, at least to the extent that, in the absence of torque (in a quiescent state), it has no net magnetization component in the axial or radial direction. The circular shape of the disk 10 enhances the stability of the polarization by providing a complete circuit. Upon the application of torque, the direction of initial magnetization turns toward the positive stress direction, i.e., toward the tensile stress in a material having positive magnetostriction, resulting in the formation of poles at the radial extremes of the magnetized region. Where the polarized circumferential band starts at the hub and extends radially outward, this creates a radial field extending from the hub 6 to the radial extent of the first magnetized region. If the disk 10 comprises more than one magnetized region, contiguous regions are oppositely polarized. Thus, the radial field in the adjacent region will extend from the radial extent of the first magnetized region to the radial extent of the second magnetized region, and the field developed by the second magnetized region will necessarily be opposite in direction to that in the first magnetized region. The radial fields can be detected outside the disk 10 material by magnetic field vector sensor means positioned axially adjacent to the disk 10, as will be discussed more fully hereinafter.

The active region, hence the disk 10 itself, must possess some source of anisotropy to return the magnetization to the established (during the polarization process) circumferential direction in each region when the applied torque is reduced to zero. To ensure a symmetrical response to CW and CCW torques, the distribution of this quiescent anisotropy should be symmetrical about the circumferential direction. To ensure that the magnetoelastic anisotropy associated with the torque causes all of the remanently magnetized portions of the disk 10 to contribute cooperatively in the development of a radial component, the quiescent anisotropy should nowhere depart more than 45° from the circumferential direction. Stated otherwise, the need for anisotropy is an expression of the need to confine the circular remanence within the circumferentially oriented 90° quadrant. Satisfactory performance is obtainable if at least 50% of the local magnetizations lie within the 90° quadrant which is symmetrically disposed around the direction of the circular remanence.

Magnetic anisotropy may be induced by physical working of the material of the disk 10. Illustrative methods for inducing magnetic anisotropy are disclosed in columns 13–15 of U.S. Pat. No. 5,520,059, the disclosure of which is incorporated herein by reference. Any physical source of magnetic anisotropy can be used, alone or in combination, to attain the desired distribution of quiescent domain orientations. One source of anisotropy is directional order, which refers to the distribution of atomic species, lattice defects, inclusions (exclusions) or other chemical or structural features found in one direction (or more than one, but not all). A second source of magnetic anisotropy is magnetoelastic, which is associated with the directionality of stress in materials having a spontaneous magnetostrictive strain correlated with their spontaneous magnetic moment. A third source of magnetic anisotropy, particularly significant in view of the circular shape of the disk 10, is shape of the material, which is associated with the divergence of M at material boundaries. Specifically, a demagnetizing field arises from the "poles"of a magnetized body, and is more intense if the poles are closely spaced. A fourth source of magnetic anisotropy is magnetocrystalline, which refers to the preferred orientation of the magnetic moments ("spins") of the atoms (ferromagnetic atoms) in directions correlated with the axes which define the crystal structure.

If the quiescent anisotropy has as its principal source the magnetocrystalline anisotropy associated with the atomic arrangements of a latticed structure possessing multiaxial symmetry, e.g., a randomly oriented polycrystalline material wherein each crystallite has cubic symmetry (including distorted cubic, e.g., tetragonal) with <100> or <111> easy axes, the quiescent circumferential remanence in more than 50% of the crystallites will automatically meet this "45°" requirement. The magnetocrystalline anisotropy in iron and all common steels have such cubic symmetry and thus (based solely on this requirement) are all candidate materials for torque transducers of the present invention. The magnitude of the anisotropy of pure iron is generally reduced by common alloying elements, although tungsten and, to a lesser extent, manganese cause it to rise. Molybdenum, vanadium and tin cause relatively small downward changes, while chromium is slightly less sluggish in causing the anisotropy to decrease from that of pure Fe. Sufficient quantities of Ni, Co, Si or Al can drive the anisotropy to zero (and below). One concern, for use in torque transducers, is with the absolute magnitude of the crystal (short for magnetocrystalline) anisotropy being too low, since this is the "spring" that returns the magnetization to its quiescent circumferential direction when the torque is removed. Thus for example, if the crystal anisotropy ($K_1$) is smaller than $\lambda \sigma_r$, where $\sigma_r$ is the magnitude of residual stresses associated with prior processing of the shaft, then $K_1$ is no longer the principal anisotropy and more than 50% of the quiescent remanence may no longer meet the 45° distribution requirement. Here is the first glimpse of the importance of inter-relationships between the several material properties that are individually important to the operation of the transducer. While $K_1$ and $\lambda$ are compositionally dependent (intrinsic) properties, $\sigma_r$ and other structure dependent properties (e.g., textures, chemical or structural ordering) act in concert with the intrinsic properties to determine the magnitude, orientation and symmetry of quiescent anisotropies. Also, while small amounts of Ni or Si effectively raise $\lambda$, they also tend to reduce $K_1$. Thus in selecting the appropriate alloy for the disk 10, we have to carefully moderate alloy content.

Examples of the categories of materials that have been found suitable for the torque transducers of the present invention are shown below. Typical grades in each category are indicated.

1. Martensitic Stainless Steels (preferably air hardened)
    AISI/SAE Grades: 403, 410, 414, 416, 420, 431, 440A, 440B, 440C
2. Precipitation Hardening Stainless Steels (chromium and nickel)
    AISI/SAE Grades: 15-5PH, 17-4PH, 17-7PH, PH 13-8Mo
3. Alloy Steels (quenched and tempered—sometimes carburized or nitrided)
    AISI/SAE Grades: 4140, 4320, 4330, 4340, 4820, 9310
    Typical Designations: 300M, Aermet 100, 98BV40, 9-4-20, 9-4-30
4. Tool Steels (preferably quenched and tempered, metallurgically "clean" high alloy steels)
    AISI Grades: Types A, D, H, L, M, O, T, W and high cobalt high speed tool steels
5. Maraging Steels (high nickel, low carbon)
    Typical Designations: 18 Ni 250, C-250, Vascomax T-300, NiMark, Marvac 736
6. Ductile Permanent Magnet Materials
    Typical Designations: Vicalloy, Remendur, Cunife, Cunico, Vacozet
7. Magnet Steels
    Typical Designations: KS Steel, MT Steel, 3.6% Cr, 15% Co, Tungsten Steel
8. Specialized Alloys and Other Materials
    Typical Designations: Permendur, Alfer, Alfenol, Kovar, Hard Drawn Nickel, Hard Drawn Permalloy In the operation of the present torque transducer, magnetic fields arise from the active region and these fields pervade not only the space in which the field sensor(s) is located but also the space occupied by the disk 10 itself. The magnetization changes caused to take place within non-active portions of the disk 10 results in other fields arising and these (parasitic) fields also pervade the regions of space where the field sensor(s) are located. This is the primary reason that hub 6 and rim 12 are desirably formed of non-ferromagnetic materials. Thus, in the interest of not corrupting the transfer function of the active region, it is important that the parasitic fields be very small, ideally zero, in comparison with the active region field or, if of significant intensity, that they change linearly and anhysteretically (or not at all) with applied torque, and that they be stable with time and under any of the operational and environmental conditions that the shaft might be subjected to. Stated otherwise, any parasitic fields which arise must be sufficiently small compared to the active region field that the net field seen by the magnetic field sensors is useful for torque sensing purposes. Thus, in order to minimize the corrupting influence of parasitic fields, it is important to utilize a disk 10 material having a coercivity sufficiently high that the field arising from the magnetoelastically active region does not magnetize regions of the disk 10 proximate to the magnetoelastically active region to give rise to parasitic magnetic fields which are of sufficient strength to destroy the usefulness, for torque sensing purposes, of the net magnetic field seen by the magnetic field sensor means. This generally means that the coercivity of the disk 10 is greater than 15 Oe, preferably greater than 20 Oe and most desirably greater than 35 Oe.

Figure 2:
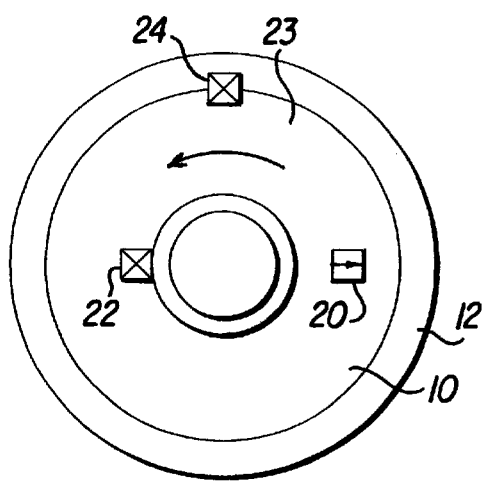
FIG. 2 is a plan view of a torque sensor of the present invention having a single magnetized region and showing illustrative positioning of magnetic field vector sensors.
Figure 3:
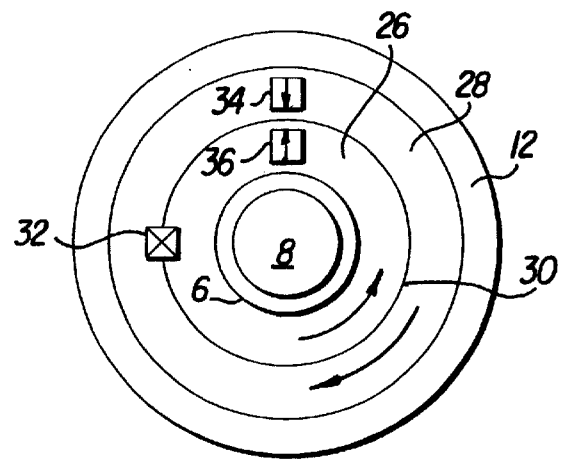
FIG. 3 is a plan view of a torque sensor of the present invention having dual, oppositely polarized regions and showing illustrative positioning of magnetic field vector sensors.

Magnetic field vector sensor 16 is a magnetic field vector sensing device located and oriented relative to disk 10 so as to sense the magnitude and polarity of the field arising in the space about the active regions of disk 10 as a result of the reorientation of the polarized magnetization from the quiescent circumferential direction. Magnetic field vector sensor 16 provides a signal output reflecting the magnitude of the applied torque. In one preferred embodiment, magnetic field vector sensor 16 is an integrated circuit Hall effect sensor. Most preferred for use in connection with the torque sensor of the present invention are flux-gate inductors having a solenoidal form which radially span the radial extent of each active region. By virtue of their geometry, they are sensitive to magnetic fields from end to end of their cores. Thus, rather than merely sensing at a single point, the preferred flux-gate inductors sense along the fall radial length of the active regions, averaging local moments from the many domains developed along the radial extent of the sensor. This characteristic of the sensor mitigates any negative effects which otherwise might have developed based upon radial non-uniformity of the field which arises based upon the developed torsional stress. Wires 18 connect the magnetic field vector sensor 16 to a source of direct current power, and transmit the signal output of the magnetic field vector sensor to a receiving device (not shown), such as a control or monitoring circuit for the machine or system incorporating disk 10. A more detailed discussion of the types, characteristics, positioning and functioning of magnetic field vector sensors appears in U.S. Pat. No. 5,351,555 at columns 6–9 and U.S. Pat. No. 5,520,059 at columns 7–11 and 25, the disclosures of which are incorporated herein by reference.

Where disk 10 comprises a single magnetized region, the radial field created and extending between the hub 6 and the radial extent of the region (outer periphery 11 when the entire radial extent of the disk is polarized) can be advantageously sensed, as shown in FIG. 2, by a sensor 20 radially centered over the active region 23 with the sensor's sensitive direction oriented in the radial direction. Alternatively, or in addition, the radial field can be sensed by a sensor 22 positioned at the hub end of the disk 10 where there exists the highest shear stress or by a sensor 24 positioned at the rim end of the disk 10. The rim position for sensor 24 is particularly advantageous only if the disk 10 is tapered from a thick end at the hub 6 to a thin end at the rim 12 to increase the shear stress at the rim. If the disk 10 is not tapered, the signal at the rim position would be too small to be advantageously sensed.

Where the disk 10 comprises dual oppositely polarized regions 26, 28 extending between the hub 6 and the rim 12, a pole is formed at the "domain wall" 30 between the two regions and at the radial extremes of the two regions. The resulting radial fields can be sensed by sensor 32 in FIG. 3 positioned axially adjacent to the disk and over the "domain wall." Alternatively, or in addition, it would also be advantageous to utilize two sensors, 34, 36 positioned along the same radial line and radially centered over each active region, with their sensitive directions oriented radially and oppositely to permit common mode field cancellation.

Figure 4:
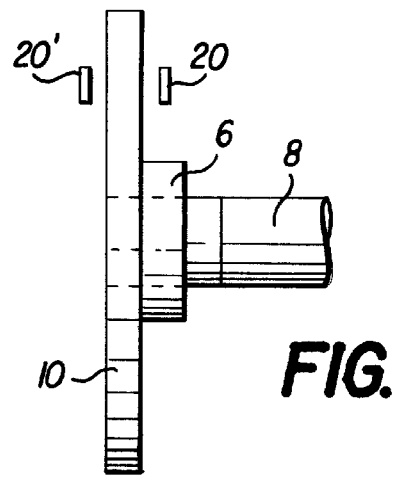
FIG. 4 is an elevational view of the disk and hub of a torque sensor of the present invention showing illustrative positioning of magnetic field vector sensors.

To obtain independence from ambient fields and to account for disk wobble, it is prudent at each sensor location to utilize two sensors, e.g., sensors 20, 20', one on each axial side of disk 10, as shown in FIG. 4. In addition, the circumferential location of the sensors with respect to the point(s) of contact on the outer rim will have to be chosen to minimize or eliminate the effect of axial or radial loading on the rim. Stated otherwise, it is preferable not to locate a sensor on the highly stressed radius immediately adjacent axial or radial loading on the rim, e.g., such as might be caused by a gear. Rather, the sensor should be positioned on the radius which is 180° away from the point of contact.

Whatever the method of attachment of the disk 10 to the hub and rim, a problem which arises is that the torsional stress in the disk 10 is inhomogenous in the area of attachment. Therefore, if the full radial extent of the disk 10 is polarized, the "pole" strength is not uniform around its circumference at the hub 6 and at the rim 12. This troublesome effect can be reduced by limiting the polarized regions to portions of the disk 10 that are far enough distant from the attachments to not feel their associated stress concentrations. For example, as can be seen in FIG. 1, the torque transducer comprises a disk 10 attached to a hub 6 and a rim 12 and having localized radially distinct, oppositely polarized circumferential regions 26, 28 and non-polarized circumferential end regions 38, 40. In addition, it is beneficial to utilize a homogenizer ring at the domain wall 30, which ring is formed of a magnetically soft material such as Permalloy, for providing independence from circumferential variations in the quiescent signal due to material inhomogeneities. It is also advantageous to leave a radially small "dead space" between the two oppositely polarized regions 26, 28 to provide a "flat-topped" transfer function of radial position vs. sensitivity in order to avoid "run-out" problems.

The disk-shaped transducer of the present invention will be able to measure power or energy as well as torque, which would be particularly useful, for example, if the disk 10 were the chain sprocket of an exercise bicycle, by the placement of some uniformly spaced salient feature on the disk 10, such as apertures therein, to modulate the permeance of the flux paths through the magnetic field vector sensor as the disk 10 rotates. The result is that the field intensity in space near the disk 10 will vary in intensity with a circumferential pattern representative of the uniformly spaced salient feature and, therefore, the resulting signal is indicative of the speed of disk rotation. Features other than apertures in the disk 10 may also be used to modulate the permeance of the flux paths through the sensor. For example, the field modulator may be a series of Permalloy dots uniformly spaced around the peripheral margin of the face of the disk 10. The resulting signal is indicative of power as well as torque, as is disclosed in U.S. Pat. No. 5,591,925, the disclosure of which is incorporated herein by reference.

What is claimed is:

1. A magnetoelastic torque sensor for providing an output signal indicative of the torque transmitted between radially separated locations, comprising:

a generally disk-shaped member having opposite generally circular surfaces and a central axis of rotation, said member including a first magnetoelastically active region which is both ferromagnetic and magnetostrictive, said region being magnetically polarized in a single circumferential direction and possessing sufficient magnetic anisotropy to return the magnetization in said region, following the application of torque to said member, to said single circumferential direction when the applied torque is reduced to zero whereby, when torque is applied to said member, said magnetoelastically active region produces a magnetic field varying with said applied torque;

a first torque transmitting element directly or indirectly attached to or forming a part of said member at said central axis of rotation in such a manner that torque is proportionally transmitted between said member and said first transmitting element;

a second torque transmitting element directly or indirectly attached to or forming a part of said member at the periphery of said member in such a manner that torque is proportionally transmitted between said member and said second transmitting element;

one of said first and second transmitting elements being the element through which applied torque is transmitted to said member and the other of said transmitting elements being the element through which torque transmitted radially through said member is transmitted away from said member;

magnetic field sensor means mounted proximate to said magnetoelastically active region and oriented with respect thereto to sense the magnitude of the magnetic field at said sensor means and provide said output signal in response thereto;

at least said magnetoelastically active region of said member being formed of a material having a coercivity sufficiently high that the field arising from said member does not magnetize regions of said member proximate to said member to give rise to parasitic magnetic fields which are of sufficient strength to destroy the usefulness, for torque sensing purposes, of the net magnetic field seen by said magnetic field sensor means.

2. A magnetoelastic torque sensor, as claimed in claim 1, wherein said member is formed of a polycrystalline material wherein at least 50% of the distribution of local magnetizations lie within a 90° quadrant symmetrically disposed around said single circular direction.

3. A magnetoelastic torque sensor, as claimed in claim 2, wherein said member is formed of a polycrystalline material wherein each crystallite has cubic symmetry.

4. A magnetoelastic torque sensor, as claimed in claim 1, wherein said member is formed of a material selected from the group consisting of martensitic stainless steels, precipitation hardening stainless steels containing chromium and nickel, quenched and tempered alloy steels, tool steels, high nickel content maraging steels, ductile permanent magnet materials, magnet steels, Permendur, Alfer, Kovar, hard drawn nickel and hard drawn Permalloy.

5. A magnetoelastic torque sensor, as claimed in claim 1, wherein the coercivity of said member is greater than 15 Oe.

6. A magnetoelastic torque sensor, as claimed in claim 1, wherein the coercivity of said member is greater than 20 Oe.

7. A magnetoelastic torque sensor, as claimed in claim 1, wherein the coercivity of said member is greater than 35 Oe.

8. A magnetoelastic torque sensor, as claimed in claim 1, wherein said magnetic field sensor means comprises a solid state sensor.

9. A magnetoelstic torque sensor, as claimed in claim 1, wherein said magnetic field sensor means comprises a flux gate inductor.

10. A magnetoelastic torque sensor, as claimed in claim 1, wherein said magnetic field sensor means is mounted and oriented with respect to said magnetoelastically active region to sense the polarity of said magnetic field.

11. A magnetoelastic torque sensor, as claimed in claim 10, wherein said magnetic field sensor means is mounted in a fixed position relative and proximate to said magnetoelastically active region.

12. A magnetoelastic torque sensor, as claimed in claim 10, wherein said sensor means is positioned radially centered over said magnetoelastically active region.

13. A magnetoelastic torque sensor, as claimed in claim 12, wherein said sensor means comprises at least two sensors positioned proximate one of the opposite surfaces of said member.

14. A magnetoelastic torque sensor, as claimed in claim 11, wherein said sensor means comprises at least one sensor positioned proximate each of the opposite surfaces of said member.

15. A magnetoelastic torque sensor, as claimed in claims 11 wherein said member is tapered in a radial direction from a thick end at the axis of rotation to a thin end at the periphery.

16. A magnetoelastic torque sensor, as claimed in claim 15, wherein said sensor means is positioned at the periphery of said member.

17. A magnetoelastic torque sensor, as claimed in claim 1, wherein said magnetoelastically active region comprises two or more circumferentially distinct, magnetically contiguous, circumferential regions which are oppositely polarized in a circumferential direction.

18. A magnetoelastic torque sensor, as claimed in claim 17, wherein said sensor means is positioned proximate to said member and overlying the intersection of the contiguous, oppositely polarized circumferential regions.

19. A magnetoelastic torque sensor, as claimed in claim 17, wherein said magnetoelastically active region comprises two contiguous, oppositely polarized circumferential regions, said sensor means comprises two sensors positioned along the same radial line, one sensor being radially centered over each of the contiguous oppositely polarized regions.

20. A magnetoelastic torque sensor, as claimed in claim 1, wherein said magnetoelastically active region has, in the absence of a torque applied to said member, a circumferential magnetic orientation having no net magnetization component in the radial direction of said member.

21. A magnetoelastic torque sensor, as claimed in claim 1, wherein said first torque transmitting element comprises hub means for connecting a shaft to said member.

22. A magnetoelastic torque sensor, as claimed in claim 1, wherein said second torque transmitting element is a rim having a connecting device for connecting the rim to an external member.

23. A magnetoelastic torque sensor, as claimed in claim 1, wherein said first and second transmitting elements are formed of a low permeability material.

24. A magnetoelastic torque sensor, as claimed in claim 1, including low permeability spacing means for spacing said first and second transmitting elements from said magnetoelastically active region.

25. A method of sensing a torque transmitted between radially separated locations, comprising the steps of:

(a) providing a magnetoelastically active region comprising a ferromagnetic, magnetostrictive disk-shaped member having opposite generally circular surfaces and a central axis of rotation, said region being magnetically polarized in a single circumferential direction and possessing sufficient magnetic anisotropy to return the magnetization in said region, following the application of torque to said member, to said single circumferential direction when the applied torque is reduced to zero, said magnetoelastically active region being formed of a material having a coercivity sufficiently high that the torque induced field arising from said magnetoelastically active region does not magnetize regions of said member proximate to said magnetoelastically active region to give rise to parasitic magnetic fields which are of sufficient strength to destroy the usefulness, for torque sensing purposes, of the net magnetic field seen by magnetic field sensing means;

(b) providing first and second torque transmitting elements directly or indirectly attached to or forming a part of said member at said central axis of rotation and said periphery of said member in such a manner that torque is proportionally transmitted between said member and said transmitting elements;

(c) transmitting torque to said member through one of said first and second transmitting elements, radially through said member and away from said member through the other of said transmitting elements;

(d) producing a magnetic field as a consequence of transmitting torque radially through said member; and (e) sensing the magnitude of the magnetic field at a position proximate to said magnetoelastically active region as an indication of the magnitude of the torque transmitted through said member.

26. A method, as claimed in claim 25, wherein said member is formed of a polycrystalline material wherein at least 50% of the distribution of local magnetizations lie within a 90° quadrant symmetrically disposed around said single circular direction.

27. A method, as claimed in claim 25, wherein said member is formed of a polycrystalline material wherein each crystallite has cubic symmetry.

28. A method, as claimed in claim 25, wherein the coercivity of said magnetoelastically active region is greater than 15.

29. A method, as claimed in claim 25, wherein the sensing step is accomplished at least in part by positioning a magnetic field sensing device proximate to and spaced from said magnetoelastically active region.

30. A method, as claimed in claim 25, including the step of providing at least one additional circumferentially distinct, magnetoelastically active region which is magnetically continguous with said first region, each additional region being polarized in a circumferential direction which is opposite from the polarization direction of magnetically contiguous magnetoelastically active regions.

31. The magnetoelastic torque sensor, as claimed in claim 22, wherein the connecting device is selected from one of a gear, belt, raised ripple, steering wheel, link, and pin.

* * * * *